June 30, 1925.
E. E. SAWTELLE
1,543,878
DEMOUNTABLE RIM
Filed Aug. 10, 1922
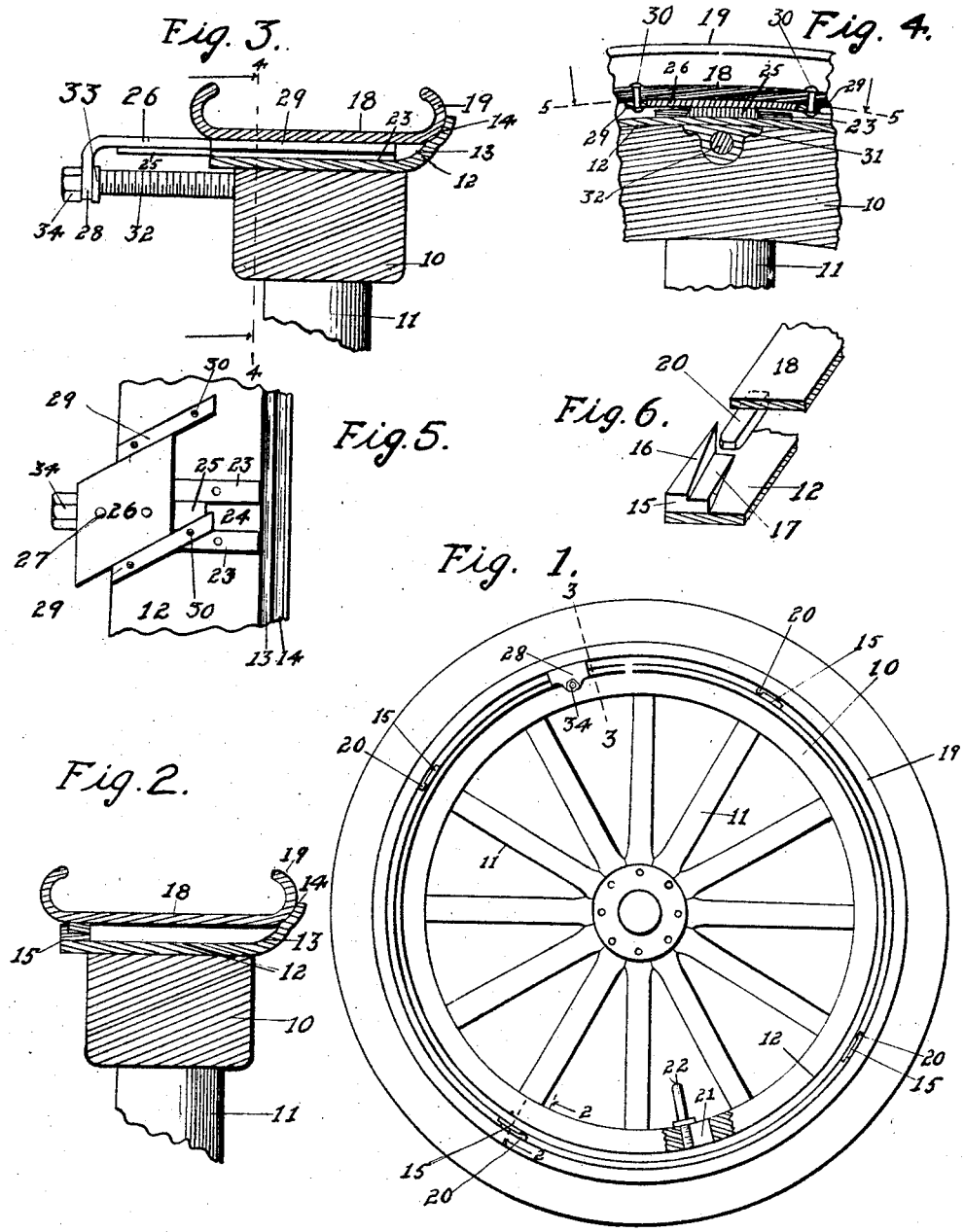
Inventor
Eber E. Sawtelle
by Orwig & Hager Attys Patented June 30, 1925.

1,543,878

UNITED STATES PATENT OFFICE.

ELVER E. SAWTELLE, OF DES MOINES, IOWA.

DEMOUNTABLE RIM.

Application filed August 10, 1922. Serial No. 580,876.

*To all whom it may concern:*

Be it known that I, ELVER E. SAWTELLE, a citizen of the United States, and a resident of Des Moines, in the county of Polk and State of Iowa, have invented a certain new and useful Demountable Rim, of which the following is a specification.

This invention relates to improvements in demountable rims for automobile wheels.

The object of my invention is to provide a demountable rim of simple, durable and inexpensive construction which may be easily and quickly applied to or removed from the wheel.

More specifically it is the object of my invention to provide a demountable rim for an automobile wheel so arranged that by the actuation of a single mechanism the rim will be positively locked to the wheel, or by a reverse movement of the locking device, the rim may be postively unlocked; that is, the coacting locking members may be positively moved out of engagement with each other so that the rim is free to be removed from the wheel without having to use a hammer or similar tool for knocking it loose.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a wheel showing the manner in which my improved rim is applied thereto. A small portion of the felly of the wheel is broken away to show the valve stem opening.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 3.

Figure 5 is a detail sectional view taken on the line 5—5 of Figure 4.

Figure 6 is a sectional perspective view showing two of the coacting locking members of my improved device together with a segmental portion of the felly rim and demountable rim to which they are respectively attached, said locking members being shown in operative relation with each other.

The numeral 10 indicates the felly of an automobile wheel 11. The felly 10 is provided with a felly rim 12, one edge of the said rim extending slightly beyond the edge of the felly, while the opposite edge of the rim is turned outwardly so as to form substantially two concaved annular grooves 13 and 14. The felly rim is secured to the felly in the usual manner. The said felly rim is provided at its edge opposite the one having the annular grooves with a series of two-way locking members 15, one of which is clearly shown in Figure 6.

The member 15 is provided with two wedge shaped members 16 and 17. The said wedge shaped member 16 is at right angles to the member 17, and has its base adjacent to the outer edge of the felly rim 12 and perpendicular thereto. The said wedge 16 extends circumferentially with the felly rim 12. The wedge 17 has its base adjacent to the felly rim and also extends circumferentially with the said rim. These wedges are clearly shown in Figure 6.

Each of the locking members 15 is mounted on the felly rim at a point in line the spokes of the felly in such a manner that the weight of the demountable rim hereinafter to be described will rest adjacent to the outer ends of the spokes. Any number of these locking members may be used, but I find four are sufficient for an ordinary size wheel.

The demountable rim 18 is substantially of the usual construction and preferably of the clincher type, the said demountable rim being designed to have one of its edges 19 rest in the annular groove 14 of the felly rim, as clearly shown in Figures 2 and 3. The said demountable rim is of such diameter that a slight space is left between its inner face and the outer face of the felly rim.

The inner face of the demountable rim has its edge opposite the one which engages the groove 14 provided with a series of blocks 20 so arranged and shaped that each will coact with one of the corresponding locking members 15, said locking blocks 20 being so arranged that all of them will engage their respective locking members simultaneously, and so arranged that when the rim 18 is rotated relative to the rim 12 in one direction, the blocks 20 will engage the wedge faces of the members 16 and 17. The wedge 16 is designed to move the rim 18 laterally and cause the curved portion 19 to engage the groove 14, the said annular groove 14 being so inclined that the rim will be wedged outwardly from the wheel center. When the block 20 engages the wedge 17 the opposite edge of the rim 18 will also be wedged outwardly from the center of the wheel.

Thus it will be seen that by simply rotating the rim 18 in a clockwise direction, as shown in Figure 1, the said rim will be locked or rigidly secured to the rim 12.

The felly 10 is provided with a slot 21 for receiving the valve stem 22. By providing the slot 21 instead of the usual opening, it will be seen that the stem 22 may be permitted to move within the slot a sufficient distance to permit the rotary movement of the rim before mentioned.

For rotating the rim 18 relative to the rim 12, I have provided the following mechanism:

The rim 12 is provided on its outer face with a pair of transversely arranged cleats 23. The cleats 23 have their inner edges beveled to form a dove tailed groove 24. Slidably mounted in the dove tailed groove 24 I have provided a slide bar 25 which is free to move transversely of the rim, and which is clearly illustrated in Figures 4 and 5. The slide bar 25 has mounted on its outer face a slide plate 26 secured in position by means of rivets 27, the plate 26 having one of its edges provided with an inwardly extending portion 28.

The front and back edges of the plate 26 are beveled relative to its side edges in such a manner that the outer face of the plate 26 forms substantially a parallelogram.

The rim 18 has its inner face provided with a pair of parallel angular cleats 29 which are so arranged as to engage the beveled edges of the plate 26 so that the said plate is free to slide between the inner edges of the angular cleats 29. These cleats are secured in position by means of rivets 30.

In the felly 10 and adjacent to the inner face of the rim 12 and opposite the slide bar 25 I provide a transversely arranged screw threaded member 31 designed to receive a transversely arranged screw threaded bolt 32. The bolt 32 has its outer end provided with a collar 33 and designed to extend rotatively through the member 28. The outer end of the bolt 32 is provided with a head 34 designed to rest against the outer face of the member 28 while the collar 33 is designed to rest against the inner face of the member 28.

Thus it will be seen that if the head 34 is rotated, the screw threaded bolt 32 will be rotated and the member 25 will be moved between the rims 18 and 12, causing the slide bar 25 also to be moved laterally. The lateral movement of the plate 26 will cause the cleats together with the rim 18 to be rotated about the rim 12. That is, if the plate 26 is moved toward the flange side of the rim 12, the rim 18 will be rotated clockwise, as shown in Figure 3, thereby causing the wedge members 20 and 15 to engage each other.

By reversing the rotation of the screw 32 it will be seen that the rim 18 will be rotated in an anti-clockwise direction, and the wedge members 15 and 20 will disengage each other.

By this arrangement it will be seen that by simply operating a single bolt head with a suitable wrench, the demountable rim may be easily and quickly removed from the felly rim. The said demountable rim is rotated in an anti-clockwise direction until the members 15 and 20 are entirely out of engagement with each other, after which the rim 18 is simply removed laterally from the wheel.

In replacing the rim it is necessary to first place the stem 22 in the slot 21 and then slide the rim 18 in position by moving it laterally in the usual manner, and then placing the plate 26 between the cleats 29, and then operating the bolt 32, as before described.

In this connection it should be borne in mind that the plate 26 and the bolt 32 never have to be removed entirely from the rim 12 on account of the inner end of the member 25 extending inwardly further than the inner end of the member 26, which permits the inner end of the member 26 to be moved outwardly to a point in alinement with the outer end of the members 29, which entirely releases the rim 19 from the rim 12. The upper portion of the rim 19 may then be elevated a slight distance as seen in Figure 1, until the members 29 rest in a plane above the member 26 after which the upper portion of the rim 19 may be moved laterally a considerable distance until the members 29 are out of alinement with the member 26, after which the rim 19 may then be lowered and the stem 22 removed from the opening 21. That is, the slide bar will always rest in the groove 24, and the inner end of the bolt 32 within the member 31.

It should also be borne in mind that the wedge members 16 and 17 should be placed on the rim 12 in such a manner that the torsional action of the rear wheels while the car is being advanced will have a tendency to tighten the demountable rim. It will be self-evident that the rim should be made in rights and lefts.

Thus it will be seen that I have provided a demountable rim of simple, durable and inexpensive construction which may be easily and quickly attached or detached from the rim, and when attached it will be rigidly secured in position.

I claim as my invention:

1. In combination, a felly rim, a demountable rim, means for causing the demountable rim to be locked to the felly rim by rotating the demountable rim relative thereto, means for rotating said demountable rim comprising a set of angular cleats secured to said demountable rim, a slide bar on said felly capable of transverse movement, a slide plate on said slide bar operatively mounted between said angular cleats, and means for actuating the slide bar.

2. In combination, a felly rim, a demountable rim, means for causing the demountable rim to be locked to the felly rim by rotating the demountable rim relative thereto, means for rotating said demountable rim comprising a set of spaced parallel cleats secured to said felly rim and arranged transversely therewith, said cleats being arranged to form a dove tail groove, a slide bar for said groove, a plate for said slide bar having its transverse edges inclined and parallel with each other, a pair of angular cleats for said demountable rim designed to coact with the inclined edges of said plates, and a laterally extending screw threaded bolt for actuating said plate and said slide bar.

3. The combination of a felly rim having one edge provided with an outwardly and laterally extending flange portion, said flange portion having one face provided with an annular groove, the opposite edge of said felly rim having its outer face provided with a series of two-way locking members, a demountable rim having one edge designed to coact with the annular groove of said felly rim and rotatively mounted relative thereto, and its inner face provided with a series of locking blocks designed to coact with said two-way locking members, a set of angular cleats, a slide bar on said felly rim, a slide plate on said slide bar operatively mounted between said angular cleats, and a laterally extending screw threaded bolt for actuating said slide plate and slide bar.

Des Moines, Iowa, July 31, 1922.

ELVER E. SAWTELLE.